United States Patent
Biskup

(10) Patent No.: US 9,430,438 B2
(45) Date of Patent: Aug. 30, 2016

(54) COMMUNICATION BUS WITH ZERO POWER WAKE FUNCTION

(71) Applicant: Atieva, Inc., Redwood City, CA (US)

(72) Inventor: Richard J. Biskup, Sunnyvale, CA (US)

(73) Assignee: ATIEVA, INC., Menlo Park, CA (US)

( * ) Notice: Subject to any disclaimer, the term of this patent is extended or adjusted under 35 U.S.C. 154(b) by 376 days.

(21) Appl. No.: 14/201,803

(22) Filed: Mar. 8, 2014

(65) Prior Publication Data

US 2015/0254206 A1    Sep. 10, 2015

(51) Int. Cl.
*G06F 13/00* (2006.01)
*G06F 13/40* (2006.01)
*G06F 13/42* (2006.01)
*G06F 1/26* (2006.01)

(52) U.S. Cl.
CPC ........... *G06F 13/4068* (2013.01); *G06F 1/266* (2013.01); *G06F 13/00* (2013.01); *G06F 13/4221* (2013.01); *Y02B 60/1228* (2013.01); *Y02B 60/1235* (2013.01)

(58) Field of Classification Search
USPC ................. 710/110, 316; 340/2.1, 2.24, 2.26
See application file for complete search history.

(56) References Cited

U.S. PATENT DOCUMENTS

| | | | | |
|---|---|---|---|---|
| 5,121,033 A | * | 6/1992 | Kosich | 315/241 R |
| 5,446,349 A | * | 8/1995 | Bocan et al. | 315/241 S |
| 5,581,246 A | * | 12/1996 | Yarberry et al. | 340/6.12 |
| 2011/0289248 A1 | * | 11/2011 | Djabbari et al. | 710/110 |
| 2013/0019037 A1 | * | 1/2013 | Flippin et al. | 710/105 |
| 2014/0025999 A1 | * | 1/2014 | Kessler | 714/43 |
| 2014/0281077 A1 | * | 9/2014 | Biskup | 710/110 |
| 2014/0281078 A1 | * | 9/2014 | Biskup | 710/110 |

* cited by examiner

*Primary Examiner* — Khanh Dang
(74) *Attorney, Agent, or Firm* — Patent Law Office of David G. Beck

(57) ABSTRACT

A two wire bidirectional bus system is provided in which at least one of the slave nodes is configured to enter into a sleep mode, thereby minimizing power drainage, whenever the bus master stops transferring data over the bidirectional bus, and to wake up whenever the bus master begins to transfer data over the bidirectional bus.

21 Claims, 4 Drawing Sheets

COMMUNICATION BUS WITH ZERO POWER WAKE FUNCTION

FIELD OF THE INVENTION

The present invention relates generally to a communication bus and, more particularly, to the design and configuration of a remote station that requires zero power when dormant.

BACKGROUND OF THE INVENTION

A communication bus, which may be consist of a computer backplane, a board bus, an on-chip bus within an integrated circuit, a local area network or LAN, a wide area network or WAN, or other type of bus, allows data (e.g., control, timing and/or data signals) to be transferred between the various components and/or devices that comprise the system. Of particular interest in the automotive industry is the controller area network, or CAN, bus. The CAN bus is a multi-master broadcast serial bus that may be implemented using balanced pair signals in twisted-pair wires, optionally in shielded cables.

In a typical, electrically isolated communication bus, power must be applied to both the bus master and the slave node(s) before a signal can cross the isolation barrier. This approach results in a continuous power drain which, in a power sensitive application such as an electric vehicle, is quite undesirable as it may impact vehicle range and performance. One technique that has been employed to reduce power drain is to turn off all unnecessary circuits in the slave node when the slave node is in a sleep mode and only activate these circuits when the slave node receives a wake-up signal from the bus master. In another approach, a further reduction in power drain is achieved by cycling the receiver circuit of the slave node on and off. This approach, however, results in increased wake latency since the wake-up signal must occur when the receiver circuit is powered up.

Accordingly, what is needed is a communication bus that allows a slave node to be completely powered down and then remotely activated by the system master. The present invention provides such a communication bus design.

SUMMARY OF THE INVENTION

The present invention provides a bidirectional bus system comprising a two wire bidirectional bus, a bus master coupled to the two wire bidirectional bus, and at least one slave node coupled to the two wire bidirectional bus, where the slave node is comprised of (i) a first galvanic isolator (e.g., a first optoisolator) coupled to a slave node microcontroller, where the first galvanic isolator transmits microcontroller generated digital data received from the slave node microcontroller to the two wire bidirectional bus; (ii) a second galvanic isolator (e.g., a second optoisolator) coupled to the slave node microcontroller, where the second galvanic isolator receives bus master digital data from the two wire bidirectional bus and transmits the bus master digital data to the slave node microcontroller; (iii) a slave node power supply coupled to the slave node microcontroller and to the second galvanic isolator, where the slave node power supply is galvanically isolated from the two wire bidirectional bus bar; and (iv) a power supply switch coupled to the slave node power supply, where the power supply switch is comprised of (a) a first transistor capable of a first state and a second state, such that when the first transistor is in the first state the slave node power supply is coupled to the slave node microcontroller and the second galvanic isolator, and when the first transistor is in the second state the slave node power supply is decoupled from the slave node microcontroller and the second galvanic isolator; and (b) a capacitor connected to the first transistor, such that the capacitor maintains the first transistor in the second state when the capacitor is charged, and allows the first transistor to transition to the first state when the capacitor is discharged. Preferably a voltage regulator is interposed between the slave node power supply and the slave node microcontroller, and interposed between the slave node power supply and the second galvanic isolator; more preferably the voltage regulator is interposed between the first transistor and the slave node microcontroller, and interposed between the first transistor and the second galvanic isolator. The first transistor is preferably comprised of a p-type MOSFET, where the first state corresponds to the p-type MOSFET being biased on, where the second state corresponds to the p-type MOSFET being turned off, where the capacitor lowers the gate voltage of the p-type MOSFET when the capacitor is discharged and raises the gate voltage of the p-type MOSFET when the capacitor is charged. Preferably when the slave node power supply is decoupled from the slave node microcontroller and from the second galvanic isolator, receipt of bus master digital data by the second galvanic isolator causes the capacitor to discharge, where discharging of the capacitor allows the first transistor to transition from its second state to its first state, thereby coupling the slave node power supply to the slave node microcontroller and to the second galvanic isolator.

In another aspect, the system further comprises a second transistor which is connected to the second galvanic isolator and which is capable of a first state and a second state, such that when the second transistor is in the first state bus master digital data is passed to the slave node microcontroller, and when the second transistor is in the second state it prevents leakage or electrical loading of the collector node of the second galvanic isolator. Furthermore, when the first transistor transitions from its second state to its first state the slave node microcontroller is preferably configured to determine if continued operation of the slave node is required, and if the slave node microcontroller determines continued operation of the slave node is required then the slave node microcontroller is configured to activate a power supply hold command, where activation of the power supply hold command places the second transistor into its first state. Preferably the slave node microcontroller is further configured to de-assert the power supply hold command upon cessation of transmission of bus master digital data to the slave node microcontroller, where de-assertion of the power supply hold command transitions the second transistor from its first state to its second state.

In another aspect, the system further comprises an n-type MOSFET which is connected to the second galvanic isolator and which is capable of a first state corresponding to the n-type MOSFET being biased on and a second state corresponding to the n-type MOSFET being turned off, such that when the n-type MOSFET is biased on bus master digital data is passed to the slave node microcontroller, and when the n-type MOSFET is turned off it prevents leakage or electrical loading of the collector node of the second galvanic isolator. Furthermore, when the first transistor transitions from its second state to its first state the slave node microcontroller is preferably configured to determine if continued operation of the slave node is required, and if the slave node microcontroller determines continued operation of the slave node is required then the slave node microcontroller is configured to activate a power supply hold command, where activation of the power supply hold command biases the n-type MOSFET on. Preferably the slave node microcontroller is further configured to de-assert the power supply hold command upon cessation of transmission of bus master digital data to the slave node microcontroller, where de-assertion of the power supply hold command turns off the n-type MOSFET.

In another aspect, the system further comprises (i) a diode interposed between the second galvanic isolator and the capacitor, and (ii) a second transistor capable of a first state and a second state. When the second transistor is in its first state, the capacitor is held discharged and the diode is reverse biased, thereby isolating the capacitor from the high speed digital data at the collector node of the second galvanic isolator and allowing the first transistor to be in its first state. When the second transistor is in its second state, the capacitor is allowed to charge and the first transistor is allowed to transition to its second state. Furthermore, when the first transistor transitions from its second state to its first state the slave node microcontroller is preferably configured to determine if continued operation of the slave node is required, and if the slave node microcontroller determines continued operation of the slave node is required then the slave node microcontroller is configured to activate a power supply hold command, where activation of the power supply hold command places the second transistor into its first state. Preferably the slave node microcontroller is further configured to de-assert the power supply hold command upon cessation of transmission of bus master digital data to the slave node microcontroller, where de-assertion of the power supply hold command transitions the second transistor from its first state to its second state.

In another aspect, the system further comprises (i) a diode interposed between the second galvanic isolator and the capacitor, and (ii) an n-type MOSFET which is capable of a first state corresponding to the n-type MOSFET being biased on and a second state corresponding to the n-type MOSFET being turned off. When the n-type MOSFET is biased on, the capacitor is held discharged and the diode is reverse biased, thereby isolating the capacitor from the high speed digital data at the collector node of the second galvanic isolator and allowing the first transistor to be in its first state. When the n-type MOSFET is turned off, the capacitor is allowed to charge and the first transistor is allowed to transition to its second state. Furthermore, when the first transistor transitions from its second state to its first state the slave node microcontroller is preferably configured to determine if continued operation of the slave node is required, and if the slave node microcontroller determines continued operation of the slave node is required then the slave node microcontroller is configured to activate a power supply hold command, where activation of the power supply hold command biases the n-type MOSFET on. Preferably the slave node microcontroller is further configured to de-assert the power supply hold command upon cessation of transmission of bus master digital data to the slave node microcontroller, where de-assertion of the power supply hold command turns off the n-type MOSFET.

In another aspect, the first transistor is preferably comprised of a p-type MOSFET, where the first state corresponds to the p-type MOSFET being biased on, where the second state corresponds to the p-type MOSFET being turned off, and where the bidirectional bus system further comprises (i) a first n-type MOSFET which is connected to the second galvanic isolator, where the first n-type MOSFET passes bus master digital data to the slave node microcontroller when the first n-type MOSFET transistor is biased on, and prevents leakage or electrical loading of the collector node of the second galvanic isolator when the first n-type MOSFET transistor is turned off; (ii) a diode interposed between the second galvanic isolator and the capacitor; (iii) a second n-type MOSFET, wherein the capacitor is held discharged and the diode is reverse biased when the second n-type MOSFET is biased on, thereby isolating the capacitor from the high speed digital data at the collector node of the second galvanic isolator and allowing the p-type MOSFET to be in its first state, and wherein the capacitor is allowed to charge and the p-type MOSFET is allowed to turn off when the second n-type MOSFET is turned off; and (iv) where the slave node microcontroller is configured to determine if continued operation of the slave node is required when the p-type MOSFET is initially biased on, wherein if the slave node microcontroller determines continued operation of the slave node is required then the slave node microcontroller is configured to activate a power supply hold command, wherein upon activation of the power supply hold command the first and second n-type MOSFETs are biased on. Additionally, the slave node microcontroller may be configured to de-assert the power supply hold command upon cessation of transmission of bus master digital data to the slave node microcontroller, wherein the first and second n-type MOSFETs are turned off when the slave node microcontroller de-asserts the power supply hold command.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, and, similarly, a first step could be termed a second step, without departing from the scope of this disclosure.

Figure 1:
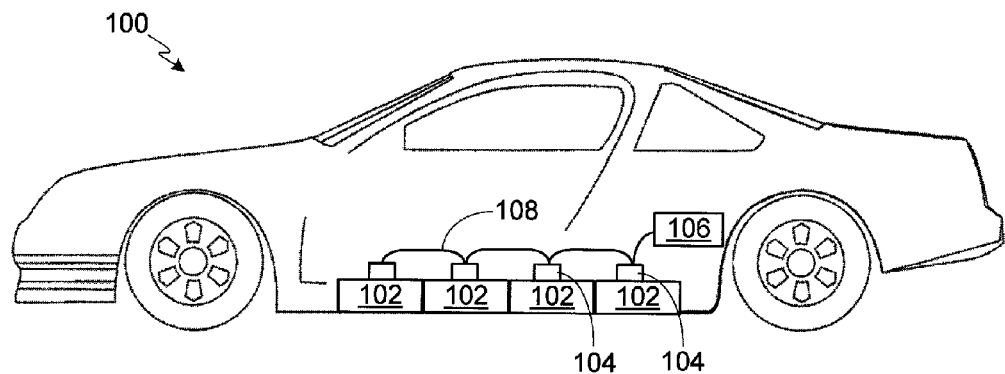
FIG. 1 is a schematic diagram of a communication bus used in an automobile that may utilize the present invention.

In FIG. 1 an electric vehicle 100 is shown with multiple battery modules 102 that may be arranged in any of a variety of parallel and series configurations to yield the desired battery pack output voltage and capacity. As used herein, the terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system. Associated with each battery module 102 is a sensor module 104. Sensor modules 104 may be used to monitor any of a variety of battery conditions, such as battery or module temperature and/or humidity, state-of-charge, charge and/or discharge rate, battery faults, etc., thus providing useful information about the overall health of the battery pack as well as any problems that may occur within the pack or within the individual batteries and couplings that comprise the pack. Sensor modules 104 and a vehicle management system 106 are connected via a communication bus 108. It should be appreciated that while communication bus 108 is illustrated in an automobile 100, the communication bus of the invention may be used with any type of land, sea or air-based vehicle as well as any other type of system that would benefit from the use of a communication bus such as that disclosed herein.

Figure 2:
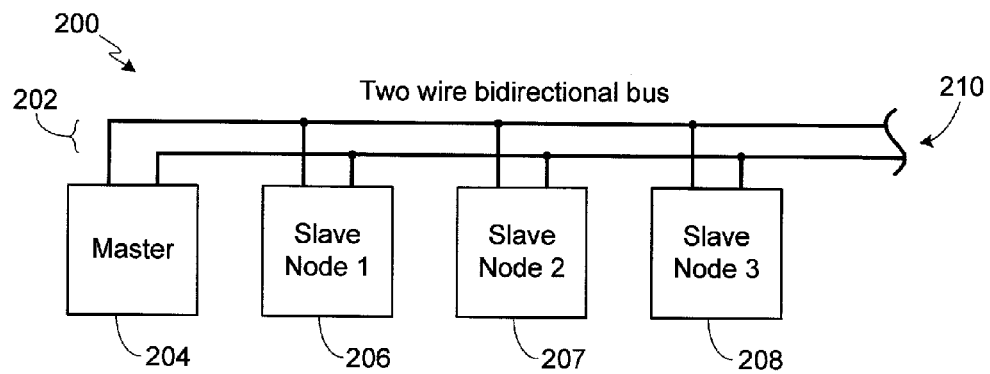
FIG. 2 is a schematic diagram of a bus master and bus slaves connected by a communication bus.

FIG. 2 shows a communication bus system 200 in accordance with some embodiments of the invention. Communication bus system 200 includes a two-wire bidirectional bus 202, a bus master 204, and bus slave nodes 206-208. It will be understood that communication bus system 200 may include a fewer or greater number of slave nodes than shown. The communication bus system 200 is suitable for the automotive battery application shown in FIG. 1, among other types of systems. The two-wire bidirectional bus 202 can be implemented utilizing paired wires, shielded cable, shielded pairs, twisted pairs, twisted pairs in shielded cable or other variations. The two-wire bidirectional bus 202 supports differential voltages, as will be further described. The far end 210 of the two-wire bidirectional bus 202 is shown as extendable. The total number of bus masters and bus slaves that can be coupled to the two-wire bidirectional bus 202 is dependent upon various factors such as capacitive loading, drive strength of the components, termination, length and impedance of the wiring, and signal timing. It should be appreciated that bus master 204 may be a controller, such as a microprocessor or programmable logic device, while slave nodes may be sensors in some embodiments.

Figure 3:
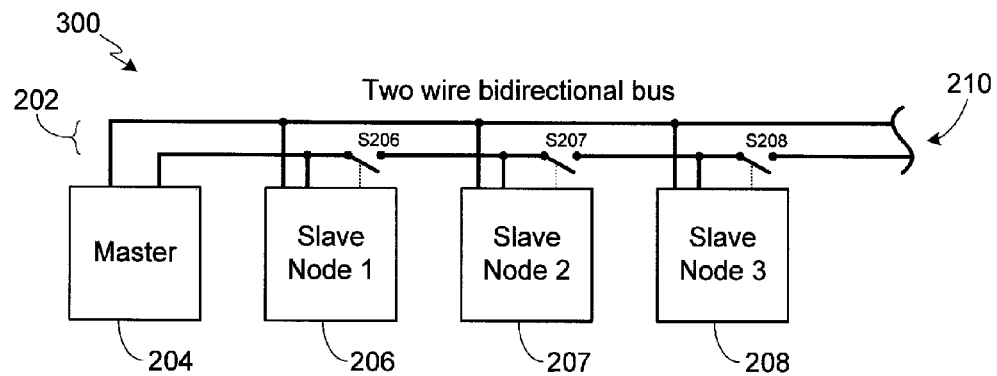
FIG. 3 is a schematic diagram of a bus master and bus slaves connected by a communication bus with switches.

FIG. 3 shows a modification of the communication bus system shown in FIG. 2. Bus system 300 includes switches that provide galvanic isolation of the slave nodes. As in the prior bus, a two-wire bidirectional bus 202 connects a bus master 204 and bus slave nodes 206-208. Corresponding to each slave node 206-208 is a switch S206-S208, respectively, that can be activated to either close or open, thereby either connecting or disconnecting the respective slave node along one of the wires of the two-wire bidirectional bus. Opening switch S206 leaves the first bus slave node 206 coupled to the bus master 204 via the two-wire bidirectional bus 202, but disconnects the downstream slave nodes, e.g., slave nodes 207 and 208, so that the downstream slave nodes no longer communicate with the bus master 204. Similarly, opening switch S207 leaves the second bus slave node 207 connected to the bus master 204 if the first switch S206 is closed, but disconnects downstream slaves, e.g., slave node 208, so that the downstream slave nodes no longer communicate with the bus master 204. These actions and conditions can be repeated for further downstream slaves. The two-wire bidirectional bus 202 supports differential voltages. Switches S206, S207, and S208 may be implemented using transistors of various types, or relays or other circuitry.

Figure 4:
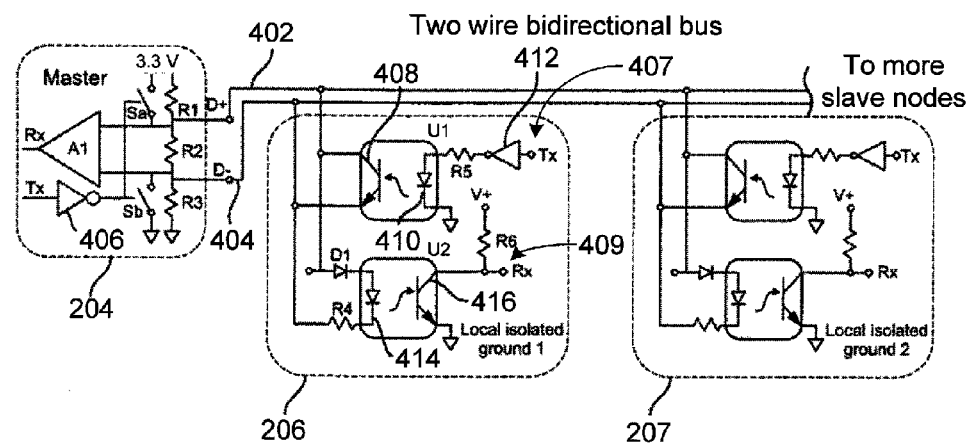
FIG. 4 is a schematic diagram of electronic circuitry in the bus master and bus slaves in accordance with some embodiments of the invention.

FIG. 4 shows an embodiment of the electronic circuitry inside of the bus master, e.g., bus master 204, and the bus slave nodes, e.g., slave nodes 206 and 207. A resistor ladder, i.e., resistors R1, R2 and R3, bias the two-wire bidirectional bus to a specified differential voltage in the absence of data flowing from either master to slave, or slave to master. In the embodiment shown, when switches Sa and Sb in master 204 are open and no data is flowing, the resistor ladder establishes about 0.9 V on the bus at bus idle. The resistor ladder also provides a termination to the two-wire bidirectional bus, establishing a termination impedance for the bus. The resistor ladder has a first resistor R1 connected between a power supply voltage and the first wire 402 of the bidirectional bus, a second resistor R2 connected between the first wire 402 and the second wire 404 of the bidirectional bus, and a third resistor R3 connected between the second wire 404 and electrical ground, which may be a local ground terminal, for example, local to the bus master 204, or a system ground. Although in the illustrated embodiment the resistor ladder is included in or otherwise associated with the bus master 204, the resistor ladder may be located elsewhere along the two-wire bidirectional bus. The resistance for resistors R1-R3 in the resistor ladder can be set at relatively low values for a low impedance bus, or set at higher values for decreased drive strength requirements placed on the bus master and the bus slave nodes. A low impedance bus, i.e., with low resistance values on the resistor ladder, generally supports higher frequency communication and greater noise immunity. One reason for the greater noise immunity is that a given current spike, from cross coupling, produces a lower voltage spike across a lower resistance value. A low impedance bus and small capacitive loading for each bus slave node added to the bus generally supports a higher number of bus slave nodes before signal rise and fall times degrade. In one example, the resistors in the resistor ladder each have about 300 to 360 ohms and the bus supports 100 kbps (kilobits per second) data rate serial communication.

Still referring to FIG. 4, a differential amplifier A1 is employed inside the bus master 204 to receive differential voltages from the two wires 402 and 404 of the bidirectional bus. It should be understood that the term "wires" may be interchanged with the term "leads." Differential amplifier A1 is tuned to recognize a first specified differential voltage range as a logical zero, and a second specified differential voltage range as a logical one, and output these logical values on the Rx terminal of the differential amplifier A1. Various types of known differential amplifiers can be used with the embodiments described herein. An output terminal Rx of the differential amplifier A1 can be connected to the receiver input of a UART (universal asynchronous receiver transmitter), for the bus master 204. In the embodiment shown, the resistor ladder has resistor values selected to establish a specified differential voltage on the two-wire bidirectional bus that is received by the differential amplifier A1 as a logical one. In turn, the logical one is passed along to the receiver input of the UART, which interprets a logical one as an idle state or mark, in the absence of timed transitions to and from the logical zero state (which would indicate data transmission). The receive path of the bus master 204 thus receives differential voltages, as established by the resistor ladder, or transmitted by one of the bus slaves, and converts these differential voltages to logical zeroes or ones via the differential amplifier A1, and expresses the logical zeroes and logical ones on the Rx terminal.

Continuing with FIG. 4, inside the bus master 204 the transmit path takes logical zeroes and logical ones from a Tx terminal, which may come from the transmitter output of the above-discussed UART, and expresses them as differential voltages on the two wires 402, 404 of the bidirectional bus. The Tx terminal is configured to buffer the logical zeroes and logical ones through a buffer 406, which can be an inverter as shown, and operating two switches Sa, Sb. The first switch Sa is connected between the power supply voltage and the first wire 402 of the bidirectional bus, and the second switch Sb is connected between the second wire 404 of the bidirectional bus and the ground terminal, which may be a local ground. In the illustrated embodiment, a logical one arriving on the Tx input of the transmit path of the bus master 204 opens the switches Sa and Sb so that the bias value of the resistor ladder R1, R2, R3 is expressed as a differential voltage value on the two wires 402 and 404 of the bidirectional bus. A logical zero arriving on the Tx input of the transmit path of the bus master 204 closes the switches Sa and Sb so that the full voltage spread from ground to the power supply voltage is expressed as a differential voltage value on the two wires 402 and 404 of the bidirectional bus. Switches Sa and Sb may be implemented using transistors, or relays or other circuitry. Control circuitry suitable for the polarity of buffer 406 and the specifications of the switches Sa and Sb can be added in some embodiments. In alternate embodiments, other values of differential voltage may be expressed for logical zeroes or logical ones, other types of drivers may be used and the switches may be replaced by three state buffers, while the circuitry may be adjusted or alternate circuitry may be devised to accommodate these changes.

Continuing with FIG. 4, bus slave 206 includes a pair of galvanic isolators U1 and U2 that galvanically isolate the transmitter and receiver of the UART or other microcontroller based device of bus slave 206 from the bidirectional bus. Preferably and as shown, each galvanic isolator U1 and U2 is comprised of an optoisolator, also commonly referred to as an optical isolator or as an opto-coupler. Assuming the use of optoisolators as preferred and illustrated, the transmit side of bus slave 206 receives digital data, i.e., logical zeroes and ones, generated by the bus slave's microcontroller and transmitted over Tx terminal 407. This data is transferred to wires 402 and 404 of the bidirectional bus using a phototransistor switch 408. When switch 408 is open, the differential voltage on the bus remains at the bias value established by the resistor ladder. When switch 408 is closed, the two wires 402 and 404 of the bus are essentially shorted together by switch 408 and the differential voltage value on the bus is close to 0 V (zero volts). Optically coupled to phototransistor 408 is an LED (light emitting diode) 410. LED 410 may produce photons in the infrared range, in the visual range, or in the ultraviolet range with phototransistor 408 being selected or matched to respond to the photons produced by the LED. A logical zero appearing on Tx terminal 407 of bus slave 206 is inverted by an inverter 412, which provides a voltage across resistor R5 and a current through resistor R5 and through LED 410. Photons from LED 410 cause phototransistor 408 to turn on, thereby closing the switch. A logical zero in the transmit path of bus slave 206 is thus expressed as an approximately 0 V differential voltage on the bidirectional bus. For example, one type of phototransistor has a nominal 5 mA sink capability when switched on, and the resistor ladder can have resistance values adjusted so that the phototransistor can sufficiently pull together the two wires 402 and 404 of the two wire bi-directional bus. A logical one in the transmit path of bus slave node 206 is expressed as open or high impedance from switch 408, so that the bias differential voltage value from the resistor ladder predominates (unless another transmitter is sending). In variations, other values of differential voltage may be expressed for logical zeroes or logical ones, and other types of drivers or switches could be used, such as those discussed with regard to the bus master.

Still referring to FIG. 4, the receive path of bus slave 206 utilizes a second galvanic isolator U2, preferably comprised of an optoisolator as illustrated, connected across wires 402 and 404 of the bidirectional bus. Optoisolator U2 includes an LED 414 and a phototransistor 416. As in the previous optoisolator, LED 414 may produce photons in the infrared range, in the visual range, or in the ultraviolet range, etc., and phototransistor 416 should be selected or matched to respond to the photons in the respective range. The optoisolator U2 acts as a differential amplifier in the sense that the output of the optoisolator responds to various differential voltages as seen on the bidirectional bus. A diode D1 is connected between the first wire 402 of the bidirectional bus and the anode (positive) terminal of LED 414, effectively raising the turn-on threshold of the circuit to two diode drops. A resistor R4 connected between the cathode (negative) terminal of LED 414 and the second wire 404 of the bidirectional bus acts as a current-limiting resistor for the two diodes D1 and 414 in series. A differential voltage of less than two diode drops on the bidirectional bus results in LED 414 being off and not generating photons, causing phototransistor 416 to be in an off state. A resistor R6 connected to a local power supply voltage and in series with the phototransistor 416 has a receiver terminal Rx 409 at the junction between the resistor R6 and the phototransistor 416. When the phototransistor 416 is off, receiver terminal Rx 409 of the bus slave 206 shows a logical one, i.e., is close to the local power supply voltage. A differential voltage of greater than two diode drops on the bidirectional bus results in LED 414 turning on and generating photons, thereby turning phototransistor 416 to an on state. With sufficient current passing through phototransistor 416, and depending on the value selected for resistor R6, receiver terminal Rx 409 of the bus slave 206 shows a logical zero. Other types of differential amplifiers or other types of input circuits can be used in variations of the bus slave 206, as can different tunings for various differential voltages and logical values. For example, a differential amplifier with hysteresis could be used, as could MOSFETs, bipolar transistors, relays, common power supply and ground connections, other types or levels of biasing or polarity and so on. The use of optoisolators U1 and U2 allows the bus slave 206 to have local ground and local power supply independent of the ground and power supply in bus master 204. This is useful when the slave node 206 is applied to monitoring circuitry for battery cells that are connected in series, where DC (direct current) voltages can develop that may be slightly or greatly in excess of the power supply voltages of the master 204 or of other slave nodes. The second slave node 207 and other slave nodes can use identical circuitry, or can use variations in circuitry. Other types of isolation devices such as transformers or level shifting circuitry can be used in variations of slave node 206.

Figure 5:
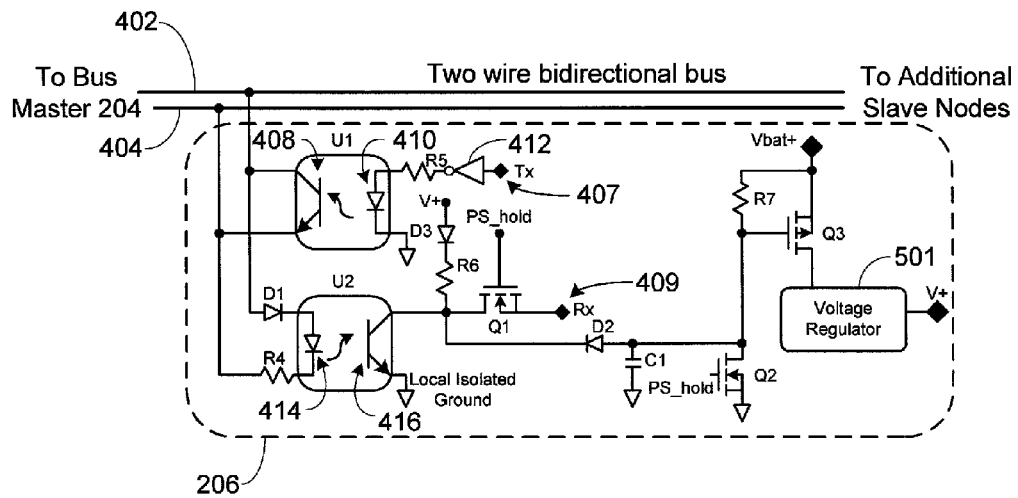
FIG. 5 is a schematic diagram of the electronic circuitry in one bus slave in accordance with some embodiments of the invention.

In accordance with a preferred embodiment of the invention, and as illustrated in FIG. 5, additional circuitry is added to the output of optoisolator U2, thereby allowing the slave node to enter into a complete sleep mode in order to minimize power drain. Note that in FIG. 5 only a single slave node 206 is shown with the additional circuitry. It should be understood that this same circuitry may be used in whichever slave node this functionality is desired, and that bus master 204 and wires 402 and 404 of the bidirectional bus are the same as previously described. As these aspects of the bus are redundant between figures, they have been eliminated in FIG. 5 to simplify the figure.

In the illustrated embodiment, slave node 206 is powered locally by a battery connected to the Vbat+ terminal. Transistor Q3, preferably a p-type MOSFET transistor, acts as a switch which controls when the battery is coupled to voltage regulator 501. Voltage regulator 501 provides a stable power supply, V+, for the microcontroller on slave node 206. When slave node 206 is in a sleep mode, Q3 is biased off, thereby de-coupling the battery from voltage regulator 501. In this mode, capacitor C1 is charged up to the full voltage of Vbat+. When charged, capacitor C1 keeps transistor Q3 biased off. In this state, slave node is not creating a power drain on the system, rather the only drain is due to the off current of Q3 and the leakage currents of some of the components of the slave node, specifically the leakage current associated with transistors Q1 and Q2, capacitor C1, diode D2 and the output transistor of U2. It will be appreciated that this drain is in the nano-amp range.

Continuing with FIG. 5, when bus master 204 transmits a data bit over the two wire directional bus, LED 414 of optoisolator U2 turns on, producing photons that are received by phototransistor 416, resulting in the generation of base current within phototransistor 416. When the collector current within phototransistor flows, capacitor C1 is discharged, thereby lowering the voltage on the gate of Q3. With the lowered gate voltage, transistor Q3 turns on and couples the battery to the voltage regulator 501. Once Q3 is turned on, the microcontroller of slave node 206 receives power, thereby allowing it to begin to execute its software (e.g., detecting and reporting battery temperature, state-of-charge, etc.). Note that due to the rapid discharge rate of capacitor C1, which is much faster than the charge rate, only a few data bits must be transmitted by bus master 204 in order to power up voltage regulator 501 and initiate microcontroller operation.

Immediately upon power-up, the microcontroller determines whether or not continued operation of the slave node is required. If continued operation is required, then the microcontroller will activate a power supply hold command, also referred to herein as the PS_hold command.

The PS_hold command serves several functions. First, it turns on transistor Q1. Transistor Q1, which is preferably an n-type MOSFET, determines whether or not to connect the slave node's microcontroller to the received data. When the PS_hold command is asserted, i.e., the PS_hold command is true, then the microcontroller receives any data from bus master 204 over the bus. When the PS_hold command is not asserted, i.e., the PS_hold command is false, Q1 prevents leakage, or electrical loading, of the collector node of optoisolator U2 when the microcontroller is powered down. The second function of the PS_hold command is to insure continued operation of the slave node microcontroller. Accordingly, when the PS_hold command is asserted, then transistor Q2 is turned on and diode D2 is reverse biased. As a result, capacitor C1 is isolated from the high speed digital data traffic arriving on the collector of optoisolator U2, thereby allowing transistor Q3 to remain on and for the battery to remain coupled to the voltage regulator. As a result, microcontroller operation continues. Preferably transistor Q2 is an n-type MOSFET.

Once the slave node microcontroller determines that bus master 204 is no longer transferring data over the bus, it initiates a slave node power down sequence. In this sequence, the PS_hold is de-asserted, i.e., the PS_hold command is made false, causing both transistors Q1 and Q2 to turn off. Turning off Q1 blocks continued data transfer over the bus from bus master 204 to the slave node microcontroller. Turning off Q2 allows capacitor C1 to charge, thereby raising the voltage on the gate of Q3 and allowing Q3 to eventually turn off. Once Q3 is biased off, the battery is de-coupled from voltage regulator 501 and the microcontroller is powered down.

Figure 6:
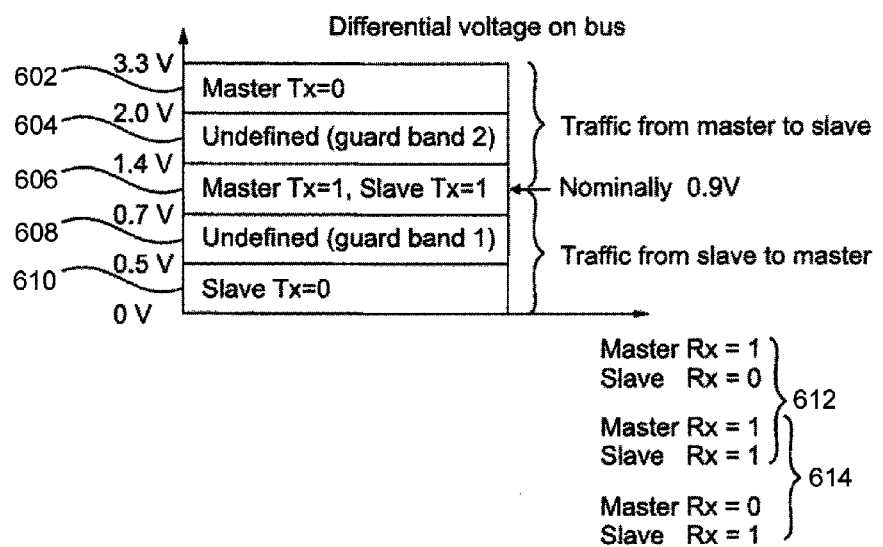
FIG. 6 is a voltage diagram of differential voltage levels, as applicable to the communication bus of some embodiments of the invention.

FIG. 6 is a diagram showing differential voltage levels as seen on the two-wire bidirectional bus of FIGS. 1-5 during normal operation. As generally understood, a differential voltage is said to be zero when the voltage on the first wire 402 (which may also be called D+ or V+) is approximately equal to the voltage on the second wire 404 (which may also be called D– or V–). The differential voltage is said to be greater than zero when the voltage on the first wire 402 is greater than the voltage on the second wire 404. Absolute voltage on the first wire 402 or the second wire 404 can be compared to a reference voltage, such as a ground voltage which may be local or global. The differential voltage values shown are selected for a specified embodiment, and can be adjusted, or used as relative or absolute voltage values, for further embodiments.

Voltages in a first voltage range 612 are transmitted from a bus master to one or more bus slaves. The first voltage range 612 includes a first voltage sub range 602 and a second voltage sub range 606. Voltages in a second voltage range 614 are transmitted from a bus slave to the bus master. The second voltage range 614 includes the second voltage sub range 606 and a third voltage sub range 610. That is, the first voltage range 612 and the second voltage range 614 overlap. The overlap of the first voltage range 612 and the second voltage range 614 includes the second voltage sub range 606. Both the first voltage sub range 602 and the third voltage sub range 610 are arranged outside of this overlap.

The first voltage sub range 602 is for a differential voltage value of between 3.3 V and 2.0 V, inclusive. The first voltage sub range 602 is expressed as a differential voltage on the bidirectional bus when the bus master is transmitting a logical zero. The first voltage sub range 602 is received by a bus master receiver as a logical one, and received by a bus slave receiver as a logical zero. The second voltage sub range 606 is for a differential voltage value of between 1.4 V and 0.7 V, inclusive. The second voltage sub range 606 is expressed as a differential voltage on the bus when the master is transmitting a logical one, a slave is transmitting a logical one, or neither a master nor a slave is transmitting, i.e., the bus is idle. The second voltage sub range 606 is received by a bus master receiver as a logical one, and received by a bus slave receiver as a logical one. The third voltage sub range 610 is for a differential voltage value of between 0.5 V and 0 V, inclusive. The third voltage sub range 610 is expressed as a differential voltage on the bus when a slave is transmitting a logical zero. The third voltage sub range 610 is received by a bus master receiver as a logical zero, and received by a bus slave receiver as a logical one. In further embodiments, the voltage levels shown in FIG. 6 could be absolute voltages, or relative voltages, applied to a two-wire bidirectional bus with one of the wires being ground or other reference voltage and the other of the wires being a signaling wire. Voltage polarities could be reversed for one of the voltage ranges, or equivalently the differential voltage could be a negative voltage for one of the voltage ranges.

Although other differential voltage value assignments and logical value assignments can be made and operated successfully on the two-wire bidirectional bus, the differential voltage values and logic value assignments shown herein have powerful properties in the communication of the bus system described herein. For example, serial communication can readily be used in the bus system, with the bus master having a UART and each of the slave nodes having a respective UART. When none of the UARTs is transmitting data, all of the UARTs are sending out an idle or mark state, which is a logical one. This is expressed as a voltage in the second voltage sub range 606, which is received by the master receiver as a logical one and received by the slave receiver as a logical one. All of the UARTs will be looking for a logical zero start bit, during this idle state. When the bus master starts transmitting, the bus master sends the start bit as a logical zero expressed as a voltage in the first voltage sub range 602 on the bus, which is received by the bus master receiver as a logical one and is received by the receivers of the respective slave nodes as a logical zero. The bus master receiver is thus not disturbed by bus master transmission as the bus master does not see its own transmissions and the bus master does not monitor the bus for bus slave traffic while the bus master is transmitting in some embodiments. It should be appreciated that the transmission from the bus master overpowers any transmission from a bus slave in some embodiments. All of the bus slave nodes (unless disconnected from the bus) receive or see the first voltage sub range 602 as a logical zero or start bit, and begin receiving serial data from the bus master. The bus master is enabled transmit to all of the slaves, but not bother receiving the bus master's own transmission. Logical zeroes and logical ones sent by the bus master are experienced by the bus master receiver as all being logical ones, keeping the bus master receiver in the idle state.

In the reverse direction, when a bus slave node starts transmitting, the bus slave node sends the start bit as a logical zero expressed as a voltage in the third voltage sub range 610 on the bus, which is received by the receivers of respective bus slave nodes as a logical one and is received by the bus master receiver as a logical zero. The receivers of the bus slave nodes are thus not disturbed by a bus slave node transmission, and can continue to look for data being sent by the bus master. The bus master (unless disconnected from a bus slave that is transmitting) receives or sees the third voltage sub range 610 as a logical zero or start bit, and begins receiving serial data from the bus slave node. The bus slave node can thus transmit to the bus master, but not bother receiving the bus slave's own transmission. Other bus slave nodes also do not bother receiving the transmission from the bus slave node. Logical zeroes and logical ones sent by the bus slave node are experienced by the bus slave receivers as all being logical ones, keeping the bus slave receivers in the idle state. With this arrangement of bus values, the bus master can broadcast to all of the bus slave nodes, i.e., operate in broadcast mode, and a single slave node can communicate back to the bus master in response. Communication processing is minimized, as the bus master receiver does not have to look at transmissions by the bus master transmitter and the bus slave receivers do not have to look at transmissions by other bus slaves. It should be appreciated that this reduces processing overhead overall.

Selection of the first, second and third voltage sub ranges 602, 606, 610 can confer a directionality to the communications, as discussed above. When the first voltage sub range 602 is observed on the two-wire bidirectional bus, communication is from the bus master to the bus slave nodes. When the third voltage sub range 610 is observed on the two-wire bidirectional bus, communication is from a bus slave node to the bus master. In one embodiment, various component values are adjusted (i.e., components selected) so that the master can "win" the bus if a rogue slave node is communicating when it shouldn't be. For example, with reference to FIG. 4, the closed-switch impedances of the switches Sa and Sb of bus master 204 can be selected at a value lower than the closed-switch impedance of the switch 408 of bus slave 206 so that bus master 204 can express a differential voltage within the first voltage sub range 602 on the bus even if a bus slave 206 is attempting to express a differential voltage within the third voltage sub range 610 on the bus.

The communication bus system described herein achieves a low-cost, bidirectional, half duplex operation over a two wire interface, with advantages provided by the various embodiments including the ability to completely power down the slave bus and then remotely power up the slave bus. The bus master as well as each of the bus slave nodes act as a transceiver for a commonly available UART as found with many microcontrollers, with the optoisolators in each bus slave providing galvanic isolation. As previously noted, each bus slave can be operated with a different local power supply by connecting to local battery cells, even when the battery cells are stacked in series. Furthermore, if one of the bus slaves experiences a local power supply failure, communication between the bus master and the remaining bus slaves is not disrupted. Differential signaling provides high immunity to common mode noise. In addition, guard band 1 608 and guard band 2 604 are provided to offer a buffer from any noise in the system. It should be understood that the ranges for guard bands 604 and 608, as well as the other voltage ranges of FIG. 6, are illustrative and not meant to be limiting as any suitable ranges may be selected to achieve the functionality described herein. The optoisolators also provide high immunity to common mode noise. Signaling voltages that are kept positive do not reverse bias the emitter-base junction of the phototransistor in the optoisolator U1 of the bus slave node, thus avoiding hot carrier injection which is known to degrade the gain of a phototransistor. The circuits shown herein operate as a transceiver for commonly available UARTs. The circuits are relatively insensitive to bus loading, allowing stable performance as additional bus slaves are added to the bus.

Figure 7:
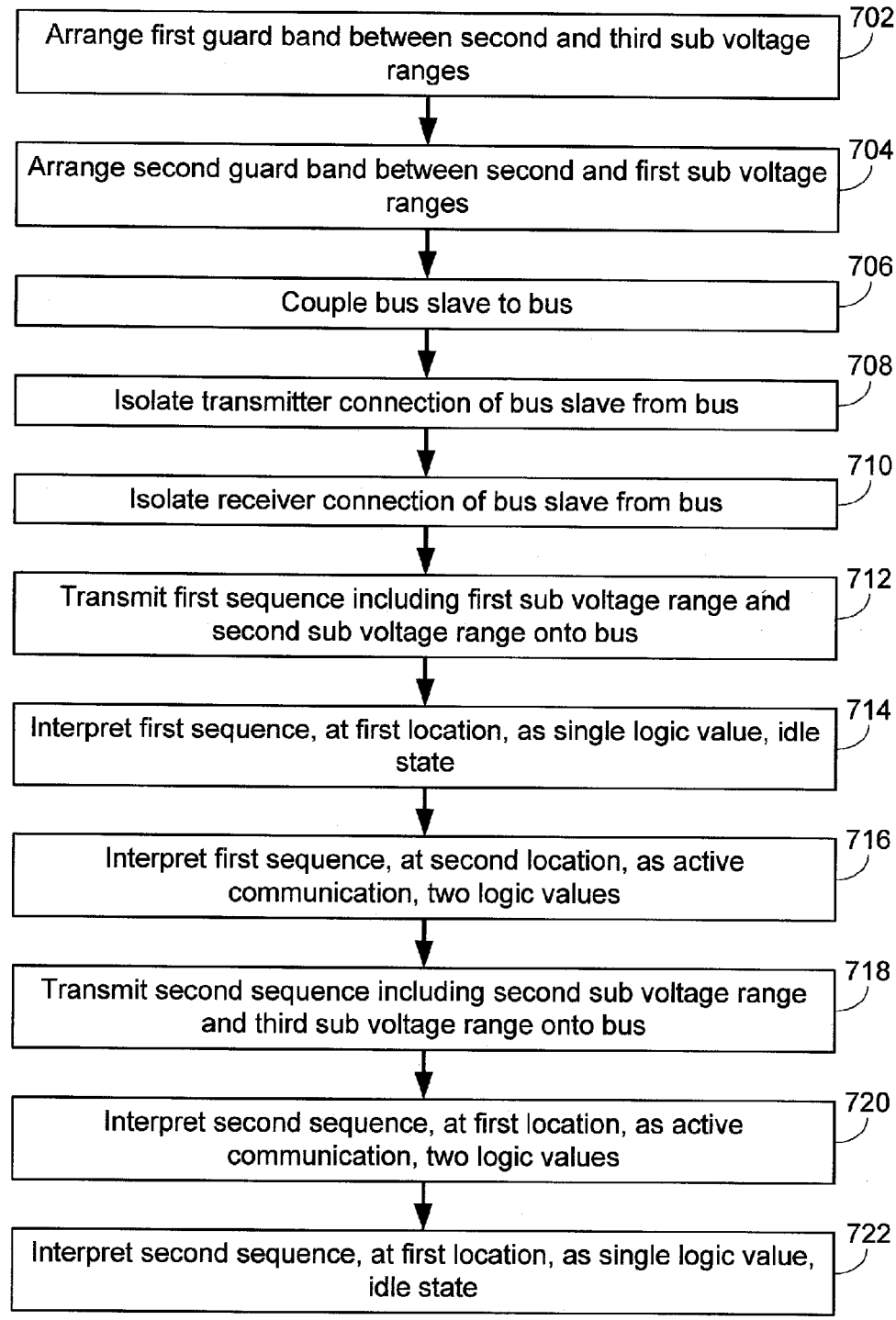
FIG. 7 is a flow diagram of a method of operating a communication bus in accordance with some embodiments of the invention.

FIG. 7 shows a method of operating a two-wire bidirectional bus. This method may be practiced using the communication bus system described herein with differential voltage values as shown in FIG. 6. The method as presented in this embodiment is compatible with the use of a UART in the bus master 204 and another UART in each of the bus slave nodes 206 and 208. Variations on the method may be practiced with fewer or additional steps or the steps may be rearranged, or may use other differential voltage values, or absolute or relative voltage values, and with various numbers of bus slaves. The method initiates with operation 702 where a first guard band is arranged between the second and third differential sub voltage ranges. The differential voltage levels and ranges shown in FIG. 6 are suitable candidates for this action. Circuit response to voltages in the second and third sub voltage ranges, and inclusion of the first guard band, can be arranged by adjusting the response of the differential amplifier A1 in the bus master 204 and/or adjusting the resistors R1, R2 and R3 in the biasing circuit coupled to the two-wire bidirectional bus of FIG. 4. In operation 704 a second guard band is arranged between the second and first sub voltage ranges. Circuit response to voltages in the second and third sub voltage ranges, and inclusion of the first guard band, may be arranged by adjusting resistors R6 and R4 and/or by adding a diode D1 in the receiver section of bus slave 206.

Continuing with FIG. 7, a bus slave is coupled to the bidirectional bus in operation 706. It should be appreciated that any number of bus slaves can be used with the embodiments described herein. A transmitter connection of a bus slave is isolated from the bus in step 708. This action can be accomplished using an optoisolator, as shown in FIGS. 4 and 5, or other isolation device. A receiver connection of the bus slave is isolated from the bus in operation 710. Similarly, this step can be accomplished using an optoisolator or other isolation device. In operation 712 a first sequence of voltages is transmitted onto the bus. The first sequence of voltages includes a voltage in the first sub voltage range and a voltage in the second sub voltage range. For example, the first sequence could be a transmission from a bus master of a serial communication of binary bits from a UART coupled to the bus master, with the voltage in the first sub voltage range representing a logical zero and the voltage in the second sub voltage range representing a logical one as illustrated in FIG. 6.

In step 714 the first sequence of voltages is interpreted, at a first location along the bus, as a single logic value associated with an idle state. For example, the first location could be where the bus master is coupled to the bus. The receiver of the bus master interprets the voltage in the first sub voltage range as a logical one. Also, the receiver of the bus master interprets the voltage in the second sub voltage range as a logical one. Accordingly, the receiver sees this single logic value and the UART coupled to the receiver of the bus master remains in the idle state. In operation 716 the first sequence is interpreted at a second location as an active communication having an application of two logic values. For example, the second location along the bus could be where a bus slave is coupled to the bus. The receiver of the bus slave interprets the voltage in the first sub voltage range as a logical zero. Also, the receiver of the slave interprets the voltage in the second sub voltage range as a logical one. So, the receiver sees these two logic values as part of a sequence of ones and zeroes, indicating an active communication of data, such as a message to be received by the UART coupled to the receiver of the bus slave.

In action 718, a second sequence of voltages is transmitted onto the bus. The second sequence of voltages includes a voltage in the second sub voltage range and a voltage in the third sub voltage range as illustrated in FIG. 6. For example, the second sequence could be a second transmission from a bus slave of a serial communication of binary bits from a UART coupled to the bus slave, with the voltage in the second sub voltage range representing a logical one and the voltage in the third sub voltage range representing a logical zero. In operation 720, the second sequence is interpreted at the first location as an active communication having an application of two logic values. For example the first location could be where the bus master is coupled to the bus. The receiver of the bus master interprets the voltage in the second sub voltage range as a logical one. Also, the receiver of the bus master interprets the voltage in the third sub voltage range as a logical zero. So, the receiver sees these two logic values as part of a sequence of ones and zeroes, indicating an active communication of data such as a message to be received by the UART coupled to the receiver of the bus master.

The second sequence of voltages is interpreted, at the second location, as a single logic value associated with an idle state, in an action 722. For example, the second location could be where the bus slave is coupled to the bus. The receiver of the bus slave interprets the voltage in the second sub voltage range as a logical one. The receiver of the bus slave also interprets the voltage in the third sub voltage range as a logical one. Thus the receiver of the bus slave sees this single logic value and the UART coupled to the receiver of the bus slave remains in the idle state. Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A bidirectional bus system, comprising:
   a two wire bidirectional bus;
   a bus master coupled to said two wire bidirectional bus;
   at least one slave node coupled to said two wire bidirectional bus, said at least one slave node further comprising:
      a first galvanic isolator coupled to a slave node microcontroller, wherein said first galvanic isolator transmits microcontroller generated digital data received from said slave node microcontroller to said two wire bidirectional bus;
      a second galvanic isolator coupled to said slave node microcontroller, wherein said second galvanic isolator receives bus master digital data from said two wire bidirectional bus and transmits said bus master digital data to said slave node microcontroller;
      a slave node power supply coupled to said slave node microcontroller and to said second galvanic isolator, wherein said slave node power supply is galvanically isolated from said two wire bidirectional bus; and
      a power supply switch coupled to said slave node power supply, said power supply switch further comprising:
         a first transistor, wherein said first transistor in a first transistor first state couples said slave node power supply to said slave node microcontroller and to said second galvanic isolator, and wherein said first transistor in a first transistor second state decouples said slave node power supply from said slave node microcontroller and from said second galvanic isolator; and a capacitor connected to said first transistor, wherein said capacitor maintains said first transistor in said first transistor second state when said capacitor is charged, and wherein said capacitor allows said first transistor to transition to said first transistor first state when said capacitor is discharged.

2. The bidirectional bus system of claim 1, wherein said first galvanic isolator is comprised of a first optoisolator, and wherein said second galvanic isolator is comprised of a second optoisolator.

3. The bidirectional bus system of claim 1, further comprising a voltage regulator interposed between said slave node power supply and said slave node microcontroller and interposed between said slave node power supply and said second galvanic isolator.

4. The bidirectional bus system of claim 3, wherein said voltage regulator is interposed between said first transistor and said slave node microcontroller and interposed between said first transistor and said second galvanic isolator.

5. The bidirectional bus system of claim 1, wherein said first transistor is comprised of a p-type MOSFET transistor, wherein said first transistor first state corresponds to said p-type MOSFET transistor biased on, and wherein said first transistor second state corresponds to said p-type MOSFET transistor turned off.

6. The bidirectional bus system of claim 5, wherein said capacitor lowers a gate voltage of said p-type MOSFET transistor when said capacitor is discharged, and wherein said capacitor raises said gate voltage of said p-type MOSFET transistor when said capacitor is charged.

7. The bidirectional bus system of claim 1, wherein when said slave node power supply is decoupled from said slave node microcontroller and from said second galvanic isolator, receipt of said bus master digital data by said second galvanic isolator causes said capacitor to discharge, wherein discharging of said capacitor allows said first transistor to transition from said first transistor second state to said first transistor first state thereby coupling said slave node power supply to said slave node microcontroller and to said second galvanic isolator.

8. The bidirectional bus system of claim 1, further comprising a second transistor connected to said second galvanic isolator, wherein said second transistor in a second transistor first state passes said bus master digital data to said slave node microcontroller, and wherein said second transistor in a second transistor second state prevents leakage or electrical loading of a collector node corresponding to said second galvanic isolator.

9. The bidirectional bus system of claim 8, wherein when said first transistor transitions from said first transistor second state to said first transistor first state, said slave node microcontroller is configured to determine if continued operation of said slave node is required, wherein if said slave node microcontroller determines continued operation of said slave node is required then said slave node microcontroller is configured to activate a power supply hold command, wherein activation of said power supply hold command places said second transistor into said second transistor first state.

10. The bidirectional bus system of claim 9, wherein said slave node microcontroller is configured to de-assert said power supply hold command upon cessation of transmission of bus master digital data to said slave node microcontroller, wherein de-assertion of said power supply hold command transitions said second transistor from said second transistor first state to said second transistor second state.

11. The bidirectional bus system of claim 8, wherein said second transistor is comprised of an n-type MOSFET transistor, wherein said second transistor first state corresponds to said n-type MOSFET transistor biased on, and wherein said second transistor second state corresponds to said n-type MOSFET transistor turned off.

12. The bidirectional bus system of claim 11, wherein when said first transistor transitions from said first transistor second state to said first transistor first state, said slave node microcontroller is configured to determine if continued operation of said slave node is required, wherein if said slave node microcontroller determines continued operation of said slave node is required then said slave node microcontroller is configured to activate a power supply hold command, wherein activation of said power supply hold command biases said n-type MOSFET transistor on.

13. The bidirectional bus system of claim 12, wherein said slave node microcontroller is configured to de-assert said power supply hold command upon cessation of transmission of bus master digital data to said slave node microcontroller, wherein de-assertion of said power supply hold command transitions said n-type MOSFET transistor from said second transistor first state to said second transistor second state.

14. The bidirectional bus system of claim 1, further comprising:
 a diode interposed between said second galvanic isolator and said capacitor; and
 a second transistor, wherein said second transistor in a second transistor first state reverse biases said diode, holds said capacitor discharged, and isolates said capacitor from a collector node of said second galvanic isolator, and wherein said second transistor in a second transistor second state allows said capacitor to charge and allows said first transistor to transition to said first transistor second state.

15. The bidirectional bus system of claim 14, wherein when said first transistor transitions from said first transistor second state to said first transistor first state, said slave node microcontroller is configured to determine if continued operation of said slave node is required, wherein if said slave node microcontroller determines continued operation of said slave node is required then said slave node microcontroller is configured to activate a power supply hold command, wherein activation of said power supply hold command places said second transistor into said second transistor first state.

16. The bidirectional bus system of claim 15, wherein said slave node microcontroller is configured to de-assert said power supply hold command upon cessation of transmission of bus master digital data to said slave node microcontroller, wherein de-assertion of said power supply hold command transitions said second transistor from said second transistor first state to said second transistor second state.

17. The bidirectional bus system of claim 14, wherein said second transistor is comprised of an n-type MOSFET transistor, wherein said second transistor first state corresponds to said n-type MOSFET transistor biased on, and wherein said second transistor second state corresponds to said n-type MOSFET transistor turned off.

18. The bidirectional bus system of claim 17, wherein when said first transistor transitions from said first transistor second state to said first transistor first state, said slave node microcontroller is configured to determine if continued operation of said slave node is required, wherein if said slave node microcontroller determines continued operation of said slave node is required then said slave node microcontroller is configured to activate a power supply hold command, wherein activation of said power supply hold command biases said n-type MOSFET transistor on.

19. The bidirectional bus system of claim 18, wherein said slave node microcontroller is configured to de-assert said power supply hold command upon cessation of transmission of bus master digital data to said slave node microcontroller, wherein de-assertion of said power supply hold command transitions said n-type MOSFET transistor from said second transistor first state to said second transistor second state.

20. The bidirectional bus system of claim 1, wherein said first transistor is comprised of a p-type MOSFET transistor, wherein said first transistor first state corresponds to said p-type MOSFET transistor biased on, and wherein said first transistor second state corresponds to said p-type MOSFET transistor turned off, said bidirectional bus system further comprising:
   a first n-type MOSFET transistor connected to said second galvanic isolator, wherein said first n-type MOSFET transistor passes said bus master digital data to said slave node microcontroller when said first n-type MOSFET transistor is biased on, and wherein said first n-type MOSFET transistor prevents leakage or electrical loading of a collector node corresponding to said second galvanic isolator when said first n-type MOSFET transistor is turned off;
   a diode interposed between said second galvanic isolator and said capacitor; and
   a second n-type MOSFET transistor, wherein said second n-type MOSFET transistor reverse biases said diode, holds said capacitor discharged, and isolates said capacitor from a collector node of said second galvanic isolator when said second n-type MOSFET transistor is biased on, and wherein said second n-type MOSFET transistor allows said capacitor to charge and allows said p-type MOSFET transistor to turn off when said second n-type MOSFET transistor is turned off;
   wherein said slave node microcontroller is configured to determine if continued operation of said slave node is required when said p-type MOSFET transistor is initially biased on, wherein if said slave node microcontroller determines continued operation of said slave node is required then said slave node microcontroller is configured to activate a power supply hold command, wherein upon activation of said power supply hold command said first and second n-type MOSFET transistors are biased on.

21. The bidirectional bus system of claim 20, wherein said slave node microcontroller is configured to de-assert said power supply hold command upon cessation of transmission of bus master digital data to said slave node microcontroller, wherein said first and second n-type MOSFET transistors are turned off when said slave node microcontroller de-asserts said power supply hold command.

* * * * *